United States Patent
Sakamoto

[15] 3,705,611
[45] Dec. 12, 1972

[54] CIRCULAR SAW AND ATTACHMENT THEREFOR

[72] Inventor: Minoru Sakamoto, 3005 Ualena Street, Honolulu, Hawaii 96819

[22] Filed: Dec. 16, 1970

[21] Appl. No.: 98,648

[52] U.S. Cl. ...........143/37 R, 143/43 A, 143/155 R, 143/159 H
[51] Int. Cl. .............................B27b 5/34, B27g 19/04
[58] Field of Search.....143/37 R, 43 R, 43 A, 155 R, 143/159 H, 155 A, 155 B, 155 C, 155 D; 83/665, 666; 144/218, 222, 237

[56] References Cited

UNITED STATES PATENTS

| 2,751,942 | 6/1956 | Emmons et al. | 143/155 R |
| 1,426,676 | 8/1922 | Rudich | 143/37 R X |
| 3,371,691 | 3/1968 | Ehinger | 143/155 R X |
| 1,322,644 | 11/1919 | Steiner | 143/37 R |

*Primary Examiner*—Andrew R. Juhasz
*Assistant Examiner*—James F. Coan
*Attorney*—Clarence A. O'Brien and Harvey B. Jacobson

[57] ABSTRACT

An elongated extension shaft engageable with the drive shaft of a circular saw and projecting therefrom for the reception thereon of a pair of laterally spaced circular saw blades mounted to provide parallel cuts. A two part positioning sleeve is mounted on the extension shaft between the blades and adjustable so as to achieve a predetermined spacing between the blades. Nut means lock the blades for rotation with the extension shaft. A laterally adjustable fixed guard overlies the upper portion of the laterally adjustable blades and a laterally adjustable swinging guard underlies the adjustable blades.

11 Claims, 5 Drawing Figures

Minoru Sakamoto
INVENTOR.

BY Clarence A O'Brien
and Harvey B. Jacobson
Attorneys

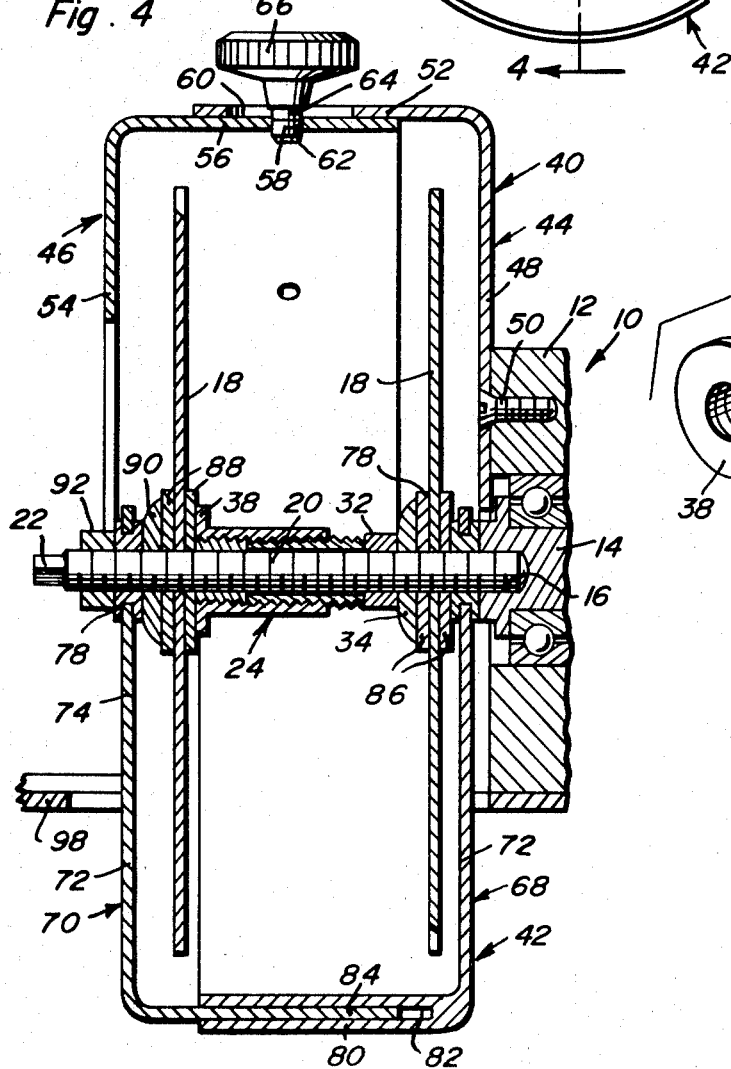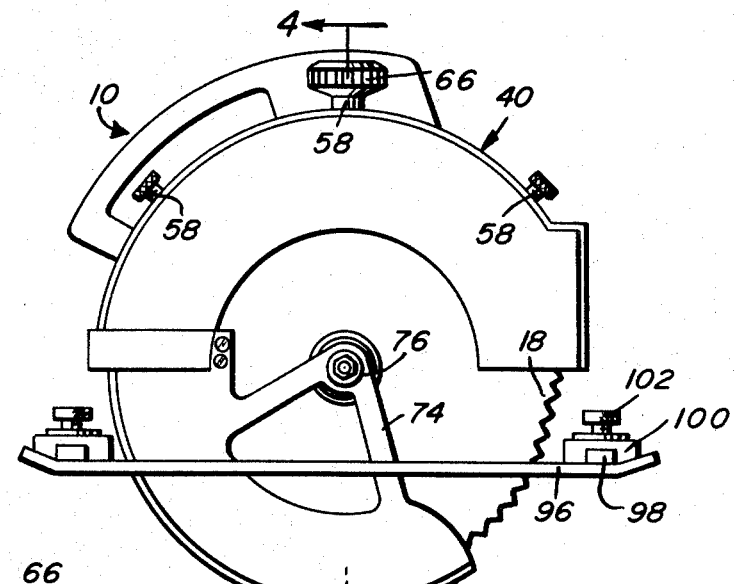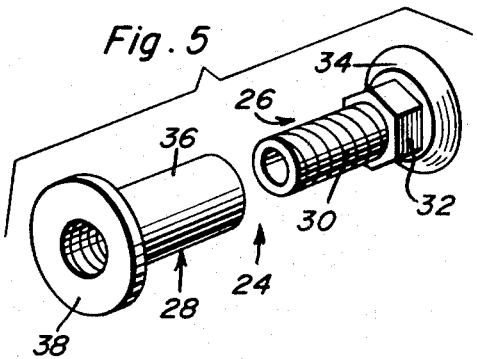

CIRCULAR SAW AND ATTACHMENT THEREFOR

The instant invention generally relates to circular saws, and is more particularly concerned with an attachment therefor whereby a pair of blades can be mounted in laterally spaced parallel relation to each other so as to form parallel cuts.

Occasions frequently arise wherein it is desirable to provide laterally spaced parallel cuts for any number of decorative or functional purposes. To do so with any accuracy, using a conventional circular saw, requires elaborate care in aligning the cuts and providing appropriate guide means for the saw as each cut is formed. It is, accordingly, a primary object of the instant invention to provide a simple although highly unique attachment for a conventional circular saw which adapts the saw to accommodate and simultaneously drive a pair of laterally spaced blades so as to form parallel cuts as desired.

In conjunction with the above object, it is also a highly significant object of the instant invention to provide for an adjustment between the mounted blades whereby the spacing of the cuts can be adjusted as desired, of course within particular limits.

A further object of significance with regard to this invention is to provide for an adjustment of the blade guards and/or shields whereby a safety enclosure can be provided for the blades throughout the range of adjustment thereof.

Other objects of the instant invention include the provision of an adapter which is easy to both mount and adjust and which provides for a highly stable mounting of the blades.

Basically, the objects of the instant invention are achieved through the provision of an elongated extension shaft which is connected to the drive shaft of a circular saw and projects therefrom for the reception of the two blades, separated by an elongated two-part extensible sleeve which positions the blades, as well as the swinging lower blade guard, and, in corporation with appropriate nut means, fixed the blades for rotation with the drive and extension shafts.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is an outer end view of the saw with the attachments;

FIG. 4 is an enlarged cross-sectional view taken substantially on a plane passing along line 4—4 in FIG. 3; and FIG. 5 is an exploded perspective view of the two components of the positioning sleeve.

Figure 1:
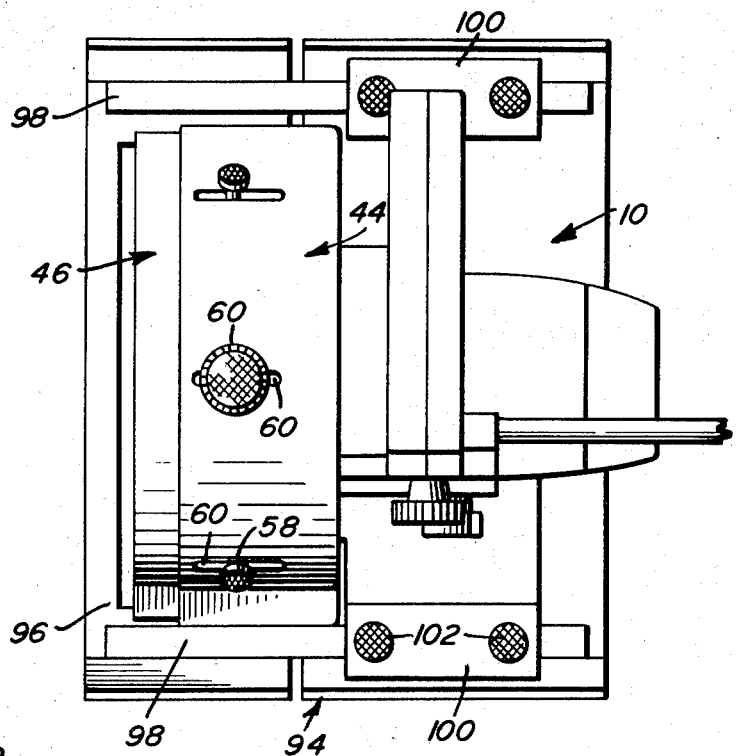
FIG. 1 is a top plan view of a circular saw with the components of the instant invention mounted thereon.
Figure 2:
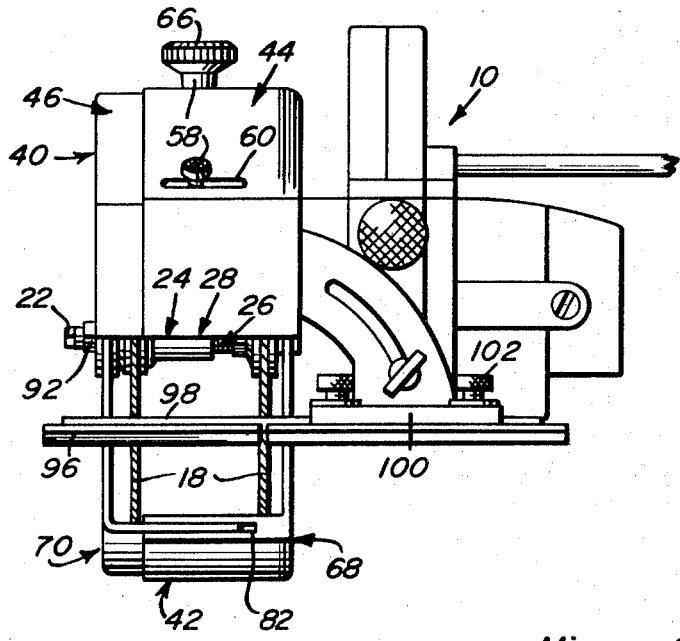
FIG. 2 is a front elevational view of the saw.

Referring now more specifically to the drawings, reference numeral 10 is used to generally designate the circular saw which is to be modified and receive the attachments of the instant invention. The saw 10 includes an appropriate housing 12 within which a powered drive shaft 14 is rotatably mounted and exposed to one side of the housing 12 for the mounting of a conventional circular saw by appropriate nut means or the like affixed to the drive shaft 14 in any desirable manner. For example, the outer portion of the drive shaft 14 can incorporate an internally threaded socket which will receive a blade mounting bolt.

As previously indicated, it is an intention of the instant invention to adapt the saw 10 to accommodate, rather than the conventionally provided single circular saw blade, a pair of laterally spaced parallel saw blades 18. In order to effect this, an elongated threaded extension shaft 20 is provided and locked to the drive shaft 14 for rotation therewith. In those situations wherein the outer mounting end of the drive shaft 14 includes the internally threaded bore 16, the extension 20 will be merely threaded therein as illustrated in FIG. 4. In order to facilitate a mounting of the extension shaft 20, the outer end thereof is provided with an integral tool receiving head 22.

The separation between the blades 18 is defined by an extensible positioning sleeve 24 received over the shaft 20 between the blades 18. This sleeve 24 includes a pair of telescoping hollow sections, an inner section 26 and an outer section 28. The sleeve section 26 includes an externally threaded shank portion 30 integrally mounting a nut 32 and enlarged saw plate 34 at one end thereof. The shank 30 and saw plate 34 freely slide on the extension shaft 20, while the nut 32 is threadedly engaged therewith. The exterior sleeve section 28 includes an internally threaded shank 36 and an enlarged annular collar or flange 38 about one end thereof. As will be appreciated, the inner sleeve section shank 30 is telescopically threaded within the outer sleeve section shank 36 so as to adjust the effective length of the sleeve 24 and hence the spacing between the blades 18.

The instant invention also contemplates provision for extensible guide means comprising an upper fixed guard or shield 40 and a lower swinging guide or shield 42.

The upper guard 40 includes inner and outer sections 44 and 46 arcuately configured so as to overlie the upper portion of the blades 18 in spaced relation thereto. The guard section 44 includes a first vertical portion 48 bolted or otherwise rigidly affixed to the saw housing 12 as indicated at 50, and a second integral laterally extending portion 52 which overlies the blades in outwardly spaced relation thereto. The outer section 46 includes an arcuate vertically orientated portion 54, paralleling the housing mounted portion 48, and a laterally extending portion 56 which slidably underlies the inner section lateral portion 52. The two sections 44 and 46 are adjustable locked together by three adjusting screws or bolts 58 received through elongated slots 60 in the outer lateral portion 52 and threaded within internally threaded holes 62 within the inner laterally extending portion 56. Each of these adjusting bolts 54 includes a bearing shoulder 64 thereon which engages against the outer surface of the outer portion 52 whereby, upon a tightening of the bolt 58, a positive clamping of the portions 52 and 56 is effected which results in a mounting of the outer guard portion 46 on the body mounted inner guard portion 44. As will be recognized, the elongated slots 60 enable a lateral adjustment of the fixed guard or shield 40 so as to accommodate the adjustment of the blades 18. As will be best appreciated from FIG. 3, the central adjusting bolt 58 incorporates an enlarged manipulating head 66 thereon in order that it might also be used as a saw gripping means during the use of the saw 10.

The lower guard or shield 42 also includes inner and outer sections 68 and 70. Each of these sections 68 and 70 includes an arcuately configured vertical outer portion 72. Each of the bottom guard or shield side portions 72 in turn incorporate integral radial arms 74 and a central hub 76 which is rotatably received within an annular peripherally grooved collar 78 mounted on the extension shaft 20. In this manner, both of the lower shield sections 68 and 70 are mounted for swinging movement about the shaft so as to move from approximately the position of FIG. 3 to a rearwardly and upwardly swung retracted position upon advancement of the blades 18 into the work. The inner shield section 68 includes a laterally directed portion 80 which defines a full length narrow deep internal pocket 82. This pocket 82 in turn telescopically receives a laterally directed full length portion 84 on the outer guard section 70 whereby a continuous enclosing of the blades 18 is effected throughout the range of lateral adjustment of the lower guard 42, this adjustment of course corresponding to the adjustment between the blades 18.

The mounting of the components on the shaft 14 will be best appreciated from FIG. 4. In this figure, it will be noted that the collar 78 associated with the inner guard section 42 is positioned against the outer end of the drive shaft 14 which in effect acts as an abutment. Next, the inner blade 18 is positioned on the extension shaft 20 between a pair of blade engaging washers 86. The positioning sleeve 24 is positioned with the integral saw plate 34 engaged against the outer washer 86 and a clamping of the blade 18 is effected by an appropriate adjustment of the sleeve nut 32. The desired spacing between the blades 18 is then provided for by an adjustment of the outer sleeve section 28 relative to the inner sleeve section 26 after which the second blade 18 is mounted on the extension shaft 20, also between a pair of washers 88. An independent saw plate 90 is positioned on the shaft in engagement with the outer washer 88 of the second plate 18, after which the outer guard mounting collar 78 is positioned. Finally, an appropriate nut 92 is threaded on the outer end portion of the extension shaft 20 and appropriately tightened so as to effectively, through the outer collar 78 and plate 90, clamp the outer blade 18 rigidly against the positioning sleeve collar 38 which in turn tends to bind the sleeve sections and properly interlock and mount all of the components on the extension shaft 20 and drive shaft 14 for a rotational driving therewith. As will be appreciated from the foregoing, the lower swinging shield 42 will be automatically adjusted so as to correspond to the spacing between the blades 18. The upper fixed shield or guard 40 can then be positioned accordingly. Incidentally, it is also contemplated that the threading on the various components be such so as to preclude any tendency or possibility of a loosening of the components occuring during the operation of the device.

The saw modifying features of the instant invention are completed by provided for a selective extension of the base plate 94. This is effected by utilizing a base plate extension 96 slidably affixed to the base plate 94 by front and rear overlying bars 98 rigidly affixed to the base plate extension 96 and extending laterally therefrom through a pair of sleeves 100 mounted on base plate 94. Each of the sleeves 100 includes a pair of lock screws 102 associated therewith for selectively clamping the received bar 98 and maintaining the plate extension 96 in the desired adjusted position.

From the foregoing, it will be appreciated that a relatively simple although highly unique means has been defined for adapting a conventional circular saw to accommodate a pair of spaced blades with the spacing between the blades being variable, within predetermined limits. Incidentally, it will be appreciated that positioning sleeves of various different lengths can be provided whereby a substantial range of adjustment can be achieved. Provision is likewise made for an adjustment of the associate components, including the guards and base.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For use in combination with a power circular saw having a drive shaft, an extension shaft engageable with said drive shaft for power rotation therewith, and means for mounting a pair of circular saw blades on said extension shaft in laterally spaced parallel relation to each other for simultaneous rotational driving thereby, said means for mounting the blades being adjustable and enabling a lateral adjustment of said blades, said means comprising an extensible positioning sleeve received over said extension shaft between said blades, said positioning sleeve comprising inner and outer telescoping sections, one of said sleeve sections including a nut on one end portion thereof, said nut being threaded on said extension shaft and adapted to frictionally clamp one shaft receive blade against abutment means on said drive shaft, said second sleeve section including a flange on one end thereof defining abutment means for second blade which functions to frictionally hold said second blade in cooperation with nut means threaded on the extension shaft to the other side of said second blade.

2. The construction of claim 1 wherein said positioning sleeve sections are in threaded engagement with each other.

3. The construction of claim 2 including guard means mountable on said saw, the width of said guard means being adjustable to correspond with the lateral adjustment of said blades.

4. The construction of claim 3 wherein said guard means includes a swinging lower guard encircling the lower portion of said blades, said lower guard incorporating first and second sections, each guard section including a blade paralleling portion pivoted on the extension shaft outward of one of the blades and a second portion underlying said blades and slidably engaged with the second portion of the other lower guard section.

5. The construction of claim 4 wherein one of said lower guard second portions defines an elongated pocket receiving the edge area of the other guard second portion.

6. The construction of claim 5 wherein said guard means also includes an upper shield comprising a first blade overlying portion adapted to be fixed to the saw and a second portion slidably engaged therewith for lateral adjustment relative thereto, and means for selectively locking the first and second portions of the shield in laterally adjusted relation to each other.

7. For use in combination with a power circular saw having a drive shaft, an extension shaft engageable with said drive shaft for power rotation therewith, means for mounting a pair of circular saw blades on said extension shaft in laterally spaced parallel relation to each other for simultaneous rotational driving thereby, said means for mounting the blades being adjustable and enabling a lateral adjustment of said blades, and guard means mountable on said saw, the width of said guard means being adjustable to correspond with the lateral adjustment of said blades.

8. The construction of claim 7 wherein said guard means includes a swinging lower guard encircling the lower portion of said blades, said lower guard incorporating first and second sections, each guard section including a blade paralleling portion pivoted on the extension shaft outward of one of the blades and a second portion underlying said blades and slidably engaged with the second portion of the other lower guard section.

9. The construction of claim 8 wherein one of said lower guard second portions defines an elongated pocket receiving the edge area of the other guard second portion.

10. The construction of claim 9 wherein said guard means also includes an upper shield comprising a first blade overlying portion adapted to be fixed to the saw and a second portion slidably engaged therewith for lateral adjustment relative thereto, and means for selectively locking the first and second portions of the shield in laterally adjusted relation to each other.

11. A power tool comprising a power unit, an elongated shaft engaged with said power unit for rotational driving thereby, said shaft projecting outwardly from said power unit, and means for mounting a pair of circular saw blades on said shaft in laterally spaced parallel relation to each other for simultaneous rotational driving thereby, said means for mounting the blades comprising an extensible positioning sleeve received over said shaft between said blades for enabling a lateral adjustment of said blades, said positioning sleeve comprising inner and outer telescoping sections, abutment means formed about said shaft toward the inner end thereof adjacent the power unit, one of said sleeve sections including a nut on the end portion thereof remote from the other sleeve section, said nut being threaded on said shaft and adapted to frictionally clamp one shaft received blade against the abutment means, said second sleeve section including a flange on the end thereof remote from said one sleeve section, said flange defining second abutment means for the second blade, said flange being located toward the outer end of said shaft and cooperating nut means threaded on the outer end of said shaft for a frictional clamping of the second blade against the flange formed second abutment means, said positioning sleeve sections being in threaded engagement with each other for a selective fixing of the sleeve sections in adjusted relation to each other.

* * * * *